United States Patent Office 3,431,292
Patented Mar. 4, 1969

3,431,292
OLEFINIC NITRILES BY AMMOXIDATION OF OLEFINS WITH PROMOTED ANTIMONY OXIDE-URANIUM OXIDE CATALYST
James L. Callahan, Bedford Heights, Robert K. Grasselli, Garfield Heights, and Warren R. Knipple, Bedford, Ohio, assignors to The Standard Oil Company, Cleveland, Ohio, a corporation of Ohio
No Drawing. Continuation-in-part of application Ser. No. 311,657, Sept. 26, 1963. This application Dec. 23, 1966, Ser. No. 604,118
U.S. Cl. 260—465.3
Int. Cl. C07c *121/04, 121/10*

3 Claims

ABSTRACT OF THE DISCLOSURE

An olefin, such as propylene, is converted to an olefinic nitrile, such as acrylonitrile, by reaction in the gas phase with oxygen and ammonia in the presence of an antimony oxide-uranium oxide catalyst which has been promoted with at least one oxide of certain other promoter elements.

---

This is a continuation-in-part of our copending application Ser. No. 311,657, filed Sept. 26, 1963 now U.S. Patent No. 3,328,315.

This invention relates to promoted oxidation catalysts containing the elements of antimony and uranium and more particularly pertains to antimony-uranium catalysts containing minor amounts of an element or elements selected from Groups I–A, I–B, II–A, II–B, III–B, IV–A, IV–B, V–B, VII–B and VIII of the Periodic Table. The catalysts of the present invention are particularly useful in the oxidation of olefins, such as propylene and isobutylene, to oxygenated hydrocarbons, such as acrolein and methacrolein, respectively, the oxidation of olefin-ammonia mixtures, such as propylene-ammonia and isobutylene-ammonia, to unsaturated nitriles, such as acrylonitrile and methacrylonitrile, respectively, and the oxydehydrogenation of olefins having from 4 to 8 carbons, such as butene-1, to diolefins, such as butadiene-1,3.

The base antimony-uranium oxide catalyst useful in the present invention is more fully described in U.S. Patent No. 3,198,750. Attrition resistant catalysts of these types are described more completely in the copending U.S. patent application of James L. Callahan and Warren R. Knipple, Ser. No. 279,308, filed May 9, 1963 now U.S. Patent No. 3,341,471. The base catalyst consists essentially of the oxides of uranium and antimony. The exact nature of the chemical compound or compounds which compose the catalyst of this invention is not known. The catalyst may be a mixture of antimony oxide or oxides and uranium oxide or oxides. It is also possible that the antimony and uranium are combined with the oxygen to form an antimonate or uranate. X-ray examination of the catalyst has indicated the presence of a structurally common phase of the antimony type, comprised of antimony oxide and some form of uranium oxide. For the purpose of the description of the invention, the base catalyst will simply be referred to as a mixture of antimony and uranium oxides, but this is not to be construed as meaning that the catalyst is composed either in whole or in part of these compounds.

The proportions of antimony and uranium in the base catalyst may vary widely. The Sb:U atomic ratio can range from about 1:50 to about 99:1. However, optimum activity appears to be obtained at Sb:U atomic ratios within the range from 1:1 to 25:1.

The catalyst may be employed without support and will display excellent activity. It also can be combined with a support, and preferably at least 10% up to about 90% of the supporting compound by weight of the entire composition is employed in this event. Any known support materials can be used, such as, for example, silica, Alundum, silicon carbide, and the inorganic phosphates, silicates, aluminates, borates and carbonates stable under the reaction conditions to be encountered in the use of the catalyst.

The antimony oxide and uranium oxide can be blended together, or can be formed separately and then blended or formed separately or together in situ. As starting materials for the antimony oxide component, for example, there can be used any antimony oxide, such as antimony trioxide, antimony tetroxide and antimony pentoxide, or mixtures thereof; or a hydrous antimony oxide, metaantimonic acid, orthoantimonic acid or pyroantimonic acid; or a hydrolyzable or decomposable antimony salt, such as an antimony halide, for example, antimony trichloride, trifluoride or tribromide; antimony pentachloride and antimony pentafluoride, which is hydrolyzable in water to form the hydrous oxide. Antimony metal can be employed, the hydrous oxide being formed by oxidizing the metal with an oxidizing acid, such as nitric acid.

The uranium oxide component can be provided in the form of uranium oxide or by precipitation in situ from a soluble uranium salt such as the nitrate, acetate, or a halide such as the chloride. Uranium metal can be used as a starting material, and if antimony metal is also employed, the antimony can be converted to the oxide and uranium to the nitrate simultaneously by oxidation in hot nitric acid. A slurry of hydrous antimony oxide formed in situ from the metal in nitric acid also can be combined with a solution of a uranium salt such as uranium nitrate, which is then precipitated in situ as uranium oxide by the addition of ammonium hydroxide. The ammonium nitrate and any other soluble salts are removed by filtration of the resulting slurry or by thermal decomposition.

It will be apparent from the above that uranium tribromide, uranium tetrabromide, uranium trichloride, uranium tetrachloride, uranium pentachloride, uranium hexafluoride, uranium tetraiodide, uranyl nitrate, uranyl sulfate, uranyl chloride, uranyl bromide, uranium trioxide, and uranium peroxide can be employed as the source of the uranium oxide component.

The catalytic activity of the system is enhanced by heating at an elevated temperature. Preferably, the catalyst mixture is dried and heated at a temperature of from about 500 to about 1150° F., preferably at about 700 to 900° F., for from two to twenty-four hours. If activity then is not sufficient, the catalyst can be further heated at a temperature above about 1000° F. but below a temperature deleterious to the catalyst at which it is melted or decomposed, preferably from about 1400° F. to about 1900° F., for from one to forty-eight hours, in the presence of air or oxygen. Usually this limit is not reached before 2000° F. and in some cases this temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed can be replaced.

The antimony oxide-uranium oxide base catalyst composition useful in the invention can be defined by the following empirical formula:

$$Sb_aU_bO_c$$

wherein $a$ is 1 to 99, $b$ is 50 to 1, and $c$ is a number taken to satisfy the average valences of antimony and uranium in the oxidation states in which they exist in the catalyst as defined by the empirical formula above.

Thus, the Sb valence may range from 3 to 5 and the U valence from 4 to 6.

OXIDATION OF OLEFINS TO OXYGENATED COMPOUNDS

The reactants used in the oxidation to oxygenated compounds are oxygen and an olefin having only three carbon atoms in a straight chain such as propylene or isobutylene or mixtures thereof.

The olefins may be in admixture with paraffinic hydrocarbons, such as ethane, propane, butane and pentane, for example, a propylene-propane mixture may constitute the feed. This makes it possible to use ordinary refinery streams without special preparation.

The temperature at which this oxidation is conducted may vary considerably depending upon the catalyst, the particular olefin being oxidized and the correlated conditions of the rate of throughput or contact time and the ratio of olefin to oxygen. In general, when operating at pressures near atmospheric, i.e., −10 to 100 p.s.i.g., temperatures in the range of 500 to 1100° F. may be advantageously employed. However, the process may be conducted at other pressures, and in the case where superatmospheric pressures, e.g., above 100 p.s.i.g., are employed, somewhat lower temperatures are possible. In the case where this process is employed to convert propylene to acrolein, a temperature range of 750 to 950° F. has been found to be optimum at atmospheric pressure.

While pressures other than atmospheric may be employed, it is generally preferred to operate at or near atmospheric pressure, since the reaction proceeds well at such pressures and the use of expensive high pressure equipment is avoided.

The apparent contact time employed in the process is not critical and it may be selected from a broad operable range which may vary from 0.1 to 50 seconds. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture.

The optimum contact time will, of course, vary depending upon the olefin being treated, but in the case of propylene and isobutylene, the preferred apparent contact time is 0.15 to 15 seconds.

A molar ratio of oxygen to olefin between about 0.5:1 to 5:1 generally gives the most satisfactory results. For the conversion of propylene to acrolein, a preferred ratio of oxygen to olefin is from about 1:1 to about 2:1. The oxygen used in the process may be derived from any source; however, air is the least expensive source of oxygen and is preferred for that reason.

We have also discovered that the addition of water to the reaction mixture has a marked beneficial influence on the course of the reaction in that it improves the conversion and the yields of the desired product. The manner in which water affects the reaction is not fully understood but the theory of this phenomenon is not deemed important in view of the experimental results we have obtained. Accordingly, we prefer to include water in the reaction mixture. Generally, a ratio of olefin to water in the reaction mixture of from 1:0.5 to 1:10 will give very satisfactory results, and a ratio of from 1:0.75 to 1:6 has been found to be optimum when converting propylene to acrolein. The water, of course, will be in the vapor phase during the reaction.

Inert diluents such as nitrogen and carbon dioxide may be present in the reaction mixture.

OXIDATION OF OLEFINS TO NITRILES

The reactants are the same as those used in the oxidation of olefins to aldehydes described above except that ammonia is included as a reactant. Any of the olefins described above can be used.

In its preferred aspect, the process comprises contacting a mixture comprising propylene or isobutylene, ammonia and oxygen with the promoted catalyst of this invention at an elevated temperature and at atmospheric or near atmospheric pressure.

Any source of oxygen may be employed in this process. For economic reasons, however, it is preferred that air be employed as the source of oxygen. From a purely technical viewpoint, relatively pure molecular oxygen will give equivalent results. The molar ratio of oxygen to the olefin in the feed to the reaction vessel should be in the range of 0.5:1 to 4:1 and a ratio of about 1:1 to 3:1 is preferred.

Low molecular weight saturated hydrocarbons do not appear to influence the reaction to an appreciable degree, and these materials can be present; consequently, the addition of saturated hydrocarbons to the feed to the reaction is contemplated within the scope of this invention. Likewise, diluents, such as nitrogen and the oxides of carbon, may be present in the reaction mixture without deleterious effect.

The molar ratio of ammonia to olefin in the feed to the reactor may vary between about 0.05:1 to 5:1. There is no real upper limit for the ammonia-olefin ratio, but there is generally no reason to exceed the 5:1 ratio. At ammonia-olefin ratios appreciably less than the stoichiometric ratio of 1:1, various amounts of oxygenated derivatives of the olefin will be formed.

Significant amounts of unsaturated aldehydes, as well as nitriles, will be obtained at ammonia-olefin ratios substantially below 1:1, i.e., in the range of 0.15:1 to 0.75:1. Outside the upper limit of this range only insignificant amounts of aldehydes will be produced, and only very small amounts of nitriles will be produced at ammonia-olefin ratios below the lower limit of this range. It is fortuitous that within the ammonia-olefin range stated, maximum utilization of ammonia is obtained and this is highly desirable. It is generally possible to recycle any unreacted olefin and unconverted ammonia.

A particularly surprising aspect of this invention is the effect of water on the course of the reaction. We have found that in many cases water in the mixture fed to the reaction vessel improves the selectivity of the reaction and the yield of nitrile. However, reactions not including water in the feed are not to be excluded from this invention inasmuch as water is formed in the course of the reaction.

In general, the molar ratio of added water to olefin, when water is added, is at least about 0.25:1. Ratios on the order of 1:1 to 3:1 are particularly desirable, but higher ratios may be employed, i.e., up to about 10:1.

The reaction is carried out at a temperature within the range of from about 550 to 1100° F. The preferred temperature range is from about 800 to 1000° F.

The pressure at which the reaction is conducted is also an important variable, and the reaction should be carried out at about atmospheric or slightly above atmospheric (2 to 3 atmospheres) pressure. In general, high pressures, i.e., about 250 p.s.ig., are not suitable since higher pressures tend to favor the formation of undesirable by-products.

The apparent contact time is not critical, and contact times in the range of from 0.1 to about 50 seconds may be employed. The optimum contact time will, of course, vary depending upon the olefin being treated, but in general, a contact time of from 1 to 15 seconds is preferred.

THE OXIDATIVE DEHYDROGENATION OF OLEFINS TO DIOLEFINS AND AROMATICS

In accordance with the present invention, this promoted catalyst system is employed in the catalytic oxidative dehydrogenation of olefins to diolefins and aromatic compounds. In the process, the feed stream in vapor form containing the olefin to be dehydrogenated and oxygen is conducted over the promoted catalyst at a comparatively low temperature to obtain the corresponding diolefin or aromatic compounds.

By the term "olefin" as used herein is meant the open chain as well as cyclic olefins. The olefins dehydrogenated in accordance with this invention have at least four and up to about eight nonquaternary carbon atoms, of which at least four are arranged in series in a straight chain or ring. The olefins preferably are either normal straight chain or tertiary olefins.

Among the many olefinic compounds which can be dehydrogenated in this way are butene-1, butene-2, pentene-1, pentene-2, tertiary pentenes and hexenes having one tertiary carbon atom, such as 2-methylpentene-1, 3-methylbutene-1, 3,4-dimethyl-pentene-1, 4-methyl-pentene-2, heptene-1, octene-1, cyclopentene, cyclohexene, 3-methyl cyclohexene and cycloheptene.

Open chain olefins yield diolefins, and in general, six-membered ring olefins yield aromatic ring compounds. The higher molecular wieght open chain olefins may cyclize to aromatic ring compounds.

The feed stock, in addition to the olefin and oxygen, can contain one or more paraffinic or naphthenic hydrocarbons having up to about 10 carbon atoms, which may be present as impurities in some petroleum hydrocarbon stocks and which may also be dehydrogenated in some cases. In this oxidative dehydrogenation reaction, propylene and isobutylene should not be included in the feed in substantial amounts.

The amount of oxygen should be within the range of from about 0.3 to about 3 moles per mole of olefin. Stoichiometrically, 0.5 to 1.5 moles of oxygen per mole of olefin is required for the dehydrogenation to diolefins and aromatics, respectively. It is preferred to employ an excess of oxygen, from 1 to about 2 moles per mole of olefin, in order to ensure a higher yield of diolefin per pass. The oxygen can be supplied as pure or substantially pure oxygen or as air or in the form of hydrogen peroxide.

When pure oxygen is used, it may be desirable to incorporate a diluent in the mixture, such as steam, carbon dioxide, or nitrogen.

The feed stock is preferably catalyticaly dehydrogenated in the presence of steam, but this is not essential. Usually, from about 0.1 to about 6 moles of steam per mole of olefin reactant is employed, but amounts larger than this can be used.

The dehydrogenation proceeds at temperatures within the range of from about 325° C. to about 1000° C. Optimum yields are obtainable at temperatures within the range from about 400 to 550° C. However, since the reaction is exothermic, temperatures in excess of 550° C. should not be used unless means are provided to carry off the heat liberated in the course of the reaction. Due to the exothermic nature of the reaction, the temperature of the gaseous reaction mixture will be higher than the temperature of the feed entering the system by as much as 75° C. The temperatures referred to are those of the entering gas feed near the reactor inlet.

The preferred reaction pressure is approximately atmospheric, within the range of from about 5 to about 75 p.s.i.g. Higher pressures up to about 300 p.s.i.g. can be used and have the advantage of simplifying the product recovery.

Only a brief contact time with the catalyst is required for effective dehydrogenation. The apparent contact time with the catalyst can vary from about 0.5 up to about 50 seconds, but higher contact times can be used if desired. At these contact times comparatively small reactors and small amounts of catalyst can be used effectively.

In general, any apparatus of the type suitable for carrying out oxidation reactions in the vapor phase may be employed in the execution of these processes. The processes may be conducted either continuously or intermittently. The catalyst bed may be a fixed bed employing a large particulate or pelleted catalyst or, in the alternative, a so-called "fluidized" bed of catalyst may be employed.

The reactor may be brought to the reaction temperature before or after the introduction of the reaction feed mixture. However, in a large scale operation, it is preferred to carry out the process in a continuous manner, and in such a system the recirculation of the unreacted olefin is contemplated.

The promoter element or elements may be added to the base catalyst in amounts ranging from 0.01 to about 20% by weight based on the weight of the promoted base catalyst. Combinations of two or more promoter elements is contemplated to be within the scope of the present invention. The promoters may be incorporated into the base catalyst by co-precipitation or impregnation. Promoter elements are conveniently added in the form of their nitrates or other salts. In any event, the promoter elements, like the antimony and uranium, probably exist in the final active catalyst in the form of their oxides.

Specific elements which are useful promoters in combination with the base catalysts are bismuth, tin, indium, platinum, boron, magnesium, silver, iron, zirconium, copper, thorium, zinc, cadmium, cobalt, nickel, rhenium, barium, lead, arsenic, tungsten, phosphorous, aluminum, cerium, calcium, antimony, cesium, iridium and palladium. Most preferred promoter elements are bismuth, tin, platinum, boron, magnesium, silver, iron, zirconium, copper, thorium, zinc, cobalt, nickel, lead, arsenic, tungsten, phosphorous, aluminum, calcium, antimony and cesium.

The catalysts and processes of the present invention are further illustrated in the following examples wherein the amounts of ingredients are expressed as parts by weight unless otherwise indicated.

Example I 90 grams of antimony metal were completely oxidized in 360 mls. of concentrated nitric acid. 81.4 grams of $UO_2(NO_3)_2 \cdot 6H_2O$ and 228 grams of Du Pont Ludox HS (30% by weight of $SiO_2$ in water) were mixed into the acidic mixture. By addition of concentrated ammonium hydroxide the slurry was brought to a pH of 8. The precipitate was filtered and washed and then divided into four portions. At this point different promoter elements in different amounts ranging from about 1 to 10% by weight based on the weight of the active base catalyst were incorporated into each of these fractions. To the wet filter cake was added a specified quantity of the promoter element nitrate, oxide, sulfate, or chloride dissolved in a minimum amount of water, and the mixture was then blended or mixed together to give a uniform distribution. Each catalyst was then dried at 120° C. and calcined at 800° F. Finally, the catalyst was activated at a temperature above 1000° F. This formulation produced a base catalyst of 70% by weight of $USb_{4.6}O_{11.8}$ and 30% by weight of silica.

126 grams of the above-described wet catalyst filter cake and 6.1 g. $Bi(NO_3)_3 \cdot 5H_2O$ were mixed together. The promoted catalyst was dried at 120° C. and calcined at 800° F. for 24 hours. It was then heat-treated at 1800° F. for 8 hours. Dry weight of the promoted catalyst containing 6.36% by weight of bismuth in the active component was 59 grams.

110 grams of the above-described wet catalyst filter cake and 2.6 grams of SnO were mixed together. The promoted catalyst was dried at 120° C. and calcined at 800° F. for 24 hours. It was then heat-treated at 1800° F. for 8 hours. Dry weight of the catalyst was 54 grams which contained 2.3 g. of Sn. The promoted catalyst contained 6.08% by weight of Sn in the active component.

2.7 grams of $In_2(SO_4)_3$ were treated with concentrated $NH_4OH$ and then the resulting material was filtered, washed and mixed with the wet catalyst filter cake described above. The promoted catalyst was dried at 120° C., calcined at 800° F. for 24 hours and heat-treated at 1800° F. for 8 hours. Dry weight of the promoted catalyst was 59 grams and the promoted catalyst contained 2.89% by weight of In based on the active component.

0.9 gram of $PtCl_4$ (in a 10% aqueous solution) was added to the wet catalyst filter cake. The promoted catalyst was dried at 120° C., calcined at 800° F. for 24 hours and heat-treated at 1800° F. for 8 hours. Dry weight of the promoted catalyst was 52 grams. The promoted catalyst contained 1.42% by weight of Pt based on the active component of the catalyst.

3.1 grams of $H_3BO_3$ were dissolved in water and added to the wet catalyst filter cake. The promoted catalyst was dried at 120° C., calcined at 800° F. for 24 hours and heat-treated at 1800° F. for 8 hours. Dry weight of the promoted catalyst was 57 grams. The promoted catalyst contained 1.36% by weight of B in the active component.

Example II

An attrition resistant catalyst was prepared as follows:
180 grams of antimony metal were completely oxidized in 720 mls. of concentrated $HNO_3$. 162.8 grams of $UO_2(NO_3)_2 \cdot 6H_2O$ were added and the mixture was evaporated almost to dryness. 456.8 grams of Du Pont HS Ludox (a 30% by weight $SiO_2$ dispersion in water) were added and the mixture was brought to a pH of 8.0 by the addition of $NH_4OH$. The catalyst was filtered and washed with 600 ml. of water in two separate portions. The catalyst was then dried at 120° C., calcined at 800° F. for 24 hours and heat-treated at 1725° F. for 8 hours. 444 grams of the foregoing catalyst were mixed with 247 grams of Ludox and the resulting product was extruded. The extrudate was dried at 120° C. and then heat-treated at 1725° F. for 72 hours.

25 grams of the above-described catalyst in the size range which would pass a 35 mesh screen but be retained on an 80 mesh screen, were mixed with a solution of 1.13 grams of $In_2SO_4$ in 10 ml. of water. This mixture was made basic with 5 ml. of 28% $NH_4OH$. It was then filtered and washed with 30 ml. of $H_2O$ in three portions. The promoted catalyst was dried at 120° C., calcined at 800° F. for 2 hours and heat-treated at 1725° F. for 2 hours.

Example III

The promoted catalysts prepared by the procedures given in Examples I and II were tested in the reaction of propylene with ammonia and oxygen to produce acrylonitrile. The reactor unit was made up of a feed induction system, a molten salt bath furnace, stainless steel microreactor containing 5 ml. of catalyst, microadsorption system and a vapor fractometer. In order to provide a steady feed stream and to maintain constant contact time, low pressure regulators (Moore Products Company; 0 to 50 inches of water) were used in connection with flow meters. The reactor was placed in the salt bath which was maintained at a constant temperature. Connections from the feed induction system to the reactor and from the reactor to the adsorption unit were made with silicone rubber seals.

All gases leaving the reaction were passed through a sintered glass tube into a half normal aqueous HCl solution. An internal standard was incorporated into the HCl solution by adding 5 ml. of methyl ethyl ketone per liter of solution. In order to ensure a minimal loss of product, the HCl solution was kept at ice bath temperature.

Separation of the products was accomplished in a Perkin-Elmer Fractometer under the following conditions. Column: a two meter length of a quarter-inch stainless steel tubing, 35% polyethylene glycol on 30 to 60 mesh fire brick, 100° C., 68 ml. of helium per minute carrier gas.

The catalyst volume in the reactor was 5 ml., the contact time was 3 seconds. The reaction temperature was 880° F., the feed was composed of propylene-ammonia-air in the molar ratio of 1:1:12, respectively. In each case a 6 minute pre-run was conducted followed by a 12 minute run in which product was collected. The results of several runs wherein several types of promoted catalyst were used are given in Table I.

Table I

| Percent promoter in catalyst: | Percent per pass conversion of propylene to acrylonitrile |
|---|---|
| 2.50 Mg | 79.5 |
| 4.25 Ag | 71.3 |
| 4.81 Fe | 68.3 |
| 3.75 Zr | 66.5 |
| 3.86 Cu | 64.6 |
| 18.6 Th | 71.0 |
| 6.36 Bi | 65.0 |
| 3.76 Cd | 63.0 |
| 3.53 Sn | 62.8 |
| Unpromoted | 60.0 |

Example IV

The procedures described in Example III were used in the conversion of propylene to acrolein. The molar feed ratio used of propylene to air was 1:10, respectively. The results are given in Table II.

Table II

| Percent promoter in catalyst: | Percent per pass conversion of propylene to acrolein |
|---|---|
| 2.50 Mg | 57.9 |
| 4.25 Ag | 60.0 |
| 3.54 Sn | 64.0 |
| Unpromoted | 50.0 |
| 3.51 Zn | 61.4 |
| 3.99 Ni | 56.8 |
| 3.83 Pb | 55.0 |
| 1.52 As | 62.3 |
| 1.55 W | 58.4 |
| 1.36 B | 68.3 |
| 4.28 Co | 54.8 |
| 4.81 Fe | 54.6 |
| 4.08 Ba | 54.4 |
| 5.47 Cu | 53.7 |

Example V

The procedures described in Example III were followed. In the analysis of butadiene obtained from butene-2, two gas chromatographic units were employed, a Fisher Gas Partitioner and a Burrell Kromo-Tog. The gas partitioner was equipped with a 4.5 foot column packed with 35% hexamethyl phosphoramide on firebrick and a 10 foot column packed with 13× molecular sieves (Linde). The carrier gas was helium at a flow rate of 45 cc./min. S.T.P. Detector current was 5 milliamperes. A 5 meter stainless steel column was employed in the Kromo-Tog, packed with 25% β,β-oxydipropionitrile on firebrick. Carrier gas was helium at a flow rate of 27 cc./min. S.T.P. The reaction temperature was 860° F. The results of several runs are given in Table III.

TABLE III

| Percent promoter in catalyst | Percent butene-2 in air | Contact time (sec.) | Percent per pass conversion of butene-2 to butadiene |
|---|---|---|---|
| Unpromoted | 4.40 | 3.7 | 40.2 |
| 1.42 Al | 10.15 | 3.9 | 48.4 |
| 1.42 Mg | 9.60 | 3.6 | 65.2 |
| 1.42 Zr | 8.05 | 3.6 | 52.9 |
| 1.42 Ca | 7.80 | 4.0 | 44.8 |
| 1.42 Th | 8.05 | 3.9 | 58.7 |
| 2.84 $CaHPO_4$ | 8.90 | 4.1 | 52.0 |
| 0.71 $FePO_4$ | 9.50 | 3.5 | 51.6 |
| 1.42 $SbPO_4$ | 8.10 | 3.8 | 49.5 |

All runs were conducted at 460° C. (860° F.). The butene-2 used was a mixture of 73% trans and 27% cis-butene-2.

Example VI

The procedures described in Example III were followed in the conversion of isobutylene, ammonia and oxygen to methacrylonitrile at a reaction temperature of 410° C. (770° F.). An ice-cooled absorber containing 5 ml. of 9.5 vol. percent water and 0.5 vol. percent concentrated HCl in n-propyl alcohol was included in the recovery line. The gas partitioner consisted of two columns in series, the first packed with 35% polyethylene glycol on firebrick and the second contained 30% diisodecyl phthalate on firebrick. Separations were made at 104° C. using 15 p.s.i. helium pressure. The results of several runs are given in Table IV. The contact time employed was 3.6 seconds and the molar feed ratio of isobutylene:ammonia:air was 1:1:15, respectively.

TABLE IV

| Promoter | Weight percent of promoter in catalyst | Percent per pass conversion of isobutylene to methacrylonitrile |
| --- | --- | --- |
| Cs | 1.87 | 57.2 |
| Co | 4.28 | 56.2 |
| Ni | 3.99 | 55.0 |
| Pt | 1.42 | 54.7 |
| Fe | 4.81 | 54.4 |
| Cu | 6.9 | 54.1 |
| Th | 3.60 | 51.8 |
| Unpromoted | | 49.3 |
| Zn | 3.50 | 51.4 |
| Doubly promoted catalysts | | |
| 1.48 Fe | 1.47 Sn | 55.6 |
| 1.29 Cu | 1.27 Mg | 54.5 |
| 1.33 Cu | 1.39 Sn | 50.1 |

Example VII

The procedures outlined in Example III were used in the conversion of isobutylene to methacrolein. The reaction temperature was 770° F., contact time was 3.6 seconds, the pre-run lasted 10 minutes and the run itself lasted 15 minutes. The molar feed ratio of isobutylene:air was 1:10, respectively. The results are given in Table V.

TABLE V

| Promoter in catalyst | Weight percent promoter | Percent per pass conversion of isobutylene to methacrolein |
| --- | --- | --- |
| Cs | 1.87 | 58.8 |
| Zn | 8.29 | 56.5 |
| Pd | 1.90 | 51.2 |
| Unpromoted | | 47.0 |

Example VIII

In accordance with the procedures of Examples I and II, catalysts were prepared which were promoted with varying amounts of phosphoric acid, boron phosphate and aluminum phosphate. These catalysts were used in the reaction of oxygen with butene-2 described in Example V. The results are given in Table VI.

TABLE VI

| Catalyst promoter | Percent butene-2 in air | Contact time (sec.) | Percent per pass conversion of butene-2 to butadiene |
| --- | --- | --- | --- |
| Unpromoted | 10.35 | 4.0 | 51.6 |
| 6.77% P | 6.65 | 7.8 | 59.2 |
| 4.52% P | 6.15 | 7.1 | 57.3 |
| 0.45% P | 7.75 | 4.0 | 63.0 |
| 0.045% P | 7.75 | 3.8 | 71.1 |
| 0.023% P | 7.85 | 4.0 | 64.3 |
| 8.37% P+2.91% B | 6.90 | 3.70 | 65.6 |
| 2.09% P+0.73% B | 8.45 | 4.1 | 79.6 |
| 0.42% P+0.15% B | 10.30 | 4.0 | 68.3 |
| 0.84% P+0.29% B | 7.35 | 4.0 | 74.9 |
| 0.21% P+0.073% B | 6.65 | 6.1 | 80.2 |
| 0.73% P+0.63% Al | 7.00 | 3.7 | 71.5 |
| 0.18% P+0.16% Al | 7.90 | 3.7 | 86.0 |
| 0.36% P+0.32% Al | 7.80 | 3.7 | 70.8 |

Example IX

In accordance with the procedures of Examples I and II, catalysts were prepared which were promoted with varying amounts of the elements given in Table VII. A reaction mixture of propylene, ammonia and air was passed through the catalyst at an elevated temperature in a micro-sieve tray fluidized catalyst reactor at a reaction temperature of 850 F. and at a contact time of 4.9 seconds. The catalyst volume was 40 ml. and the catalyst particles were from 80 to 170 mesh size. The molar ratio of propylene:air:ammonia was 1:12:1.2, respectively. The per pass conversions to acrylonitrile for the promoted catalysts compared with the unpromoted catalyst are shown in Table VII.

TABLE VII

| Promoter | Weight percent promoter | Percent per pass conversion to acrylonitrile |
| --- | --- | --- |
| Unpromoted | | 65.8 |
| Bi | 2.87 | 73.1 |
| In | 2.91 | 77.3 |
| Sn | 13.9 | 74.8 |
| Mg | 0.49 | 72.4 |
| Li | 0.07 | 75.3 |
| Fe | 0.56 | 68.9 |
| Al | 0.21 | 73.5 |
| Ge | 1.45 | 71.4 |
| Ag | 2.13 | 67.7 |

Example X

The procedure of Example IX was repeated using as feed a mixture of isobutylene:air:ammonia in the mole ratio 1:20:1,2, respectively, a contact time of 3 seconds and the promoter elements shown in Table VIII. The per pass conversions to methacrylonitrile are shown in Table VIII.

TABLE VIII

| Promoter | Weight percent promoter | Percent per pass conversion to methacrylonitrile |
| --- | --- | --- |
| Unpromoted | | 60.0 |
| Sn | 13.9 | 65.3 |
| Li | 0.07 | 70.1 |
| Mg | 0.49 | 65.4 |
| Mg | 1.42 | 64.3 |
| Ni | 2.86 | 65.9 |
| Fe | 0.56 | 69.5 |
| Fe | 2.72 | 67.1 |
| Th | 3.81 | 67.0 |
| Doubly promoted catalysts | | |
| 0.56 Fe | 0.59 Co | 67.4 |
| 0.56 Fe | 0.07 Li | 65.0 |
| 0.56 Fe | 0.24 Mg | 65.1 |

A feed of 2-methyl-butene-1:air:nitrogen in the molar ratio of 1:10-14:3-5, respectively, was pased over a fixed bed of catalyst prepared in accordance with the procedures of Examples I and II in a microreactor having a catalyst volume of 4.5 cc. at a temperature of 750° F. and at a contact time of 3.0 seconds. The per pass conversions to isoprene for the various promoted catalysts compared with the unpromoted catalyst are given in Table IX.

TABLE IX

| Promoter | Weight percent promoter | Percent per pass conversion to isoprene |
| --- | --- | --- |
| Unpromoted | | 43.2 |
| Mg | 1.76 | 44.8 |
| Pb | 2.70 | 46.2 |
| Ta | 1.1 | 49.8 |
| B | 0.95 | 51.0 |
| As | 1.05 | 45.8 |
| Zr | 5.2 | 44.7 |
| Cd | 6.1 | 55.1 |

We claim:

1. The process for the manufacture of acrylonitrile or methacrylonitrile from an olefin consisting of propylene or isobutylene which comprises contacting in the vapor phase, at a temperature at which nitrile formation proceeds, a mixture of the olefin, ammonia and oxygen, said mixture of ammonia, olefin and oxygen having a molar ratio of ammonia to olefin of from about 0.05:1 to 5:1 and a molar ratio of oxygen to olefin of from about 0.5:1 to about 4:1, at a temperature in the range of from about 550 to 1100° F. with a promoted catalyst composition consisting essentially of a base catalyst, a support and a promoter component, said base catalyst consisting essentially of the oxides of antimony and uranium, the Sb:U atomic ratio being within the range of about 1:50 to 99:1, said support being silica and said promoter component consisting essentially of an oxide of at least one element selected from the group consisting of bismuth, tin, platinum, magnesium, silver, iron, copper, thorium, cobalt, nickel, cesium, lithium, and indium.

2. The process of claim 1 wherein the olefin is propylene.

3. The process of claim 1 wherein the olefin is isobutylene.

References Cited

UNITED STATES PATENTS 3,226,421 12/1965 Giordano et al. _____ 260—465.3
3,198,750 8/1965 Callahan et al. _____ 260—465.3

JOSEPH P. BRUST, *Primary Examiner.*

U.S. Cl. X.R.

252—432, 435, 455, 456; 260—604, 680, 668